United States Patent [19]
Nezbed

[11] 3,802,914
[45] Apr. 9, 1974

[54] METHOD OF TREATING LACTOSE

[75] Inventor: Robert Louis Nezbed, Highland Park, Ill.

[73] Assignee: Kraftco Corporation, New York, N.Y.

[22] Filed: Apr. 10, 1972

[21] Appl. No.: 242,830

[52] U.S. Cl.................. 127/61, 127/58, 426/453, 426/465
[51] Int. Cl.............................................. C13k 5/00
[58] Field of Search ............... 99/199, 202, 203, 57; 127/31, 58, 61

[56] References Cited
UNITED STATES PATENTS

| | | | |
|---|---|---|---|
| 1,954,602 | 4/1934 | Supplee et al. | 127/31 |
| 2,188,907 | 2/1940 | Lavett | 99/57 |
| 3,639,170 | 2/1972 | Hutton et al. | 99/203 |

OTHER PUBLICATIONS
Bell, Industrial and Engineering Chemistry, Vol. 22, No. 1, Pages 51–54, 1–1930.

*Primary Examiner*—Morris O. Wolk
*Assistant Examiner*—Sidney Marantz
*Attorney, Agent, or Firm*—Fitch, Even, Tabin & Luedeka

[57] ABSTRACT

A method for the manufacture of lactose having at least 50 percent amorphous lactose, at least 64 percent beta-lactose and at least 20 percent crystalline beta-lactose wherein an aqueous lactose solution containing 40 to 60 percent by weight lactose is sprayed onto a heated surface so that from about 0.005 to about 0.20 pounds of the lactose solution is applied per square foot of said surface per hour. The lactose solution is permitted to remain in contact with the heated surface for a period of time sufficient to remove substantially all of the moisture from the lactose solution.

6 Claims, No Drawings

METHOD OF TREATING LACTOSE

The present invention relates generally to a method for drying lactose and, more particularly, relates to a method for drying lactose solutions to provide a lactose product suitable for use in forming tablets by a direct tableting process.

Various methods are known for forming tablets of active ingredients, with or without compounding agents, such as fillers, binders and lubricants. A preferred method of tableting is known as direct tableting. As used herein, direct tableting refers to a method of making tablets wherein a tableting mixture is prepared and is compacted directly in a tableting press in the absence of moisture and without other intermediate treatment of the tableting mixture.

Various ingredients that are desirably used in the preparation of tablets do not readily form tablets by a direct tableting process. In such instances, tablets have been formed by a process in which the tableting materials are mixed in a moist or liquid condition to form granules which are dried, and subsequently formed and compacted into tablets. This process is known as the wet granulation process. Tablets formed by the wet granulation process dissolve less rapidly than do tablets formed by direct tableting and are generally less desirable when used in the tableting of medicinal preparations. Further, the necessity of wetting with a subsequent drying step significantly increases the production cost of tablets made by the wet granulation process.

Tablets have also been formed by a dry process wherein a tableting mixture is compacted into tablets, the tablets are comminuted to form granules and the granules are recompacted into tablets. This process is known as a direct retableting or regranulation process. The direct retableting process for making tablets is also not wholly desirable in that the comminuting and recompaction steps add significantly to the complexity and cost of this method.

Lactose has been used as a compounding agent in direct tableting processes, and spray dried lactose has been principally available for this purpose. Lactose is considered to be the sugar of choice for use in tablets, and particularly in medicinal, nutritional and therapeutic tablets in that it dissolves rapidly, has little flavor or odor, is not excessively sweet, and does not have deleterious physiological effects.

A particular spray dried lactose that has heretofore been employed in direct tableting processes is described by U.S. Pat. No. 2,728,678 to Paul M. Sharp, issued Sept. 19, 1946. Although this spray dried lactose has been employed in the direct tableting of some active ingredients, it has not adequately performed in various direct tableting processes.

The crystal structure of spray dried lactose, made in accord with the foregoing patent, is such that there is insufficient cohesion of the crystals during a direct tableting process to provide tablets that are wholly resistant to "capping," e. g., the breaking off of the convex end portions of the tablet from the cylindrical body portion of the tablet. Furthermore, such lactose is usually not completely free-flowing at ambient temperatures and in some instances, when this spray dried lactose is employed in tableting mixtures, insufficient filling of the tableting dies occurs, resulting in the formation of underweight tablets that must be rejected. In addition, tablets formed by direct tableting from tableting mixtures containing such spray dried lactose are generally slow to dissolve.

It is a principal object of the present invention to provide a method for manufacturing lactose. It is another object of the present invention to provide a method for drying lactose from an aqueous solution of lactose. It is a further object of the present invention to provide a method for manufacturing a lactose product which is suitable for use in manufacturing tablets by direct tableting. A still further object is to provide a convenient and economical method for drying lactose to provide a lactose product suitable for the manufacture of improved lactose containing tablets by a direct tableting process.

Other objects and advantages of the present invention will become apparent from the following detailed description:

In general, the present invention comprises a method for drying lactose from a lactose containing solution so as to provide a lactose material which is principally beta-lactose. More particularly, the present invention comprises a method for drying aqueous lactose solutions so as to provide a lactose material having at least about 65 percent by weight of beta-lactose and a major amount of the lactose being amorphous lactose. The lactose should be substantially free from proteins, and is desirably generally in a pure form and most desirably in U. S. P. lactose.

Lactose is a milk sugar generally obtained by crystallization from whey which results from the manufacture of cheese. Lactose exists in two different crystal forms, alpha and beta. Regardless of the initial crystal form, when an aqueous solution of lactose is prepared there is a gradual change-over of form until equilibrium is established. An aqueous lactose solution contains about 40 percent alpha-lactose and about 60 percent beta-lactose at equilibrium. The proportion of alpha-lactose and beta-lactose in an aqueous solution at equilibrium varies slightly with temperature, but is not appreciably affected by the pH of the solution.

It has been discovered that if lactose employed as a compounding agent in a direct tableting process comprises at least about 65 percent by weight of beta-lactose and further comprises a major amount of amorphous lactose, the tablets formed will have improved properties with respect to tablet formation and will be readily dissoluble in water.

As previously indicated, aqueous solutions of lactose at equilibrium contain about 60 percent by weight of beta-lactose and about 40 percent of alpha-lactose. Therefore, the lactose prepared by the method of the present invention contains more than the equilibrium proportion of beta-lactose. In order to provide lactose having above the equilibrium level of beta-lactose, the drying and/or crystallization of the lactose must be carried out at temperatures above 200° F. Presently available spray dried lactose, such as that described by U.S. Pat. No. 2,728,678 to Paul M. Sharp, issued Sept. 19, 1946, is spray dried at a temperature below 200° F, e. g., about 180° F, and the spray dried lactose that is obtained has substantially less than the equilibrium level of beta-lactose. Although lactose formed by such spray drying or by various conventional crystallization procedures has sometimes been employed in direct tableting processes, the tablets formed with lactose resulting from such procedures are less satisfactory than those formed from a lactose containing tableting mixture wherein the lactose is prepared in accordance with the method of this invention.

When a lactose solution is dried rapidly enough, the viscosity of the solution increases so quickly that crystallization does not take place. Except to the extent that the lactose crystallizes prior to such rapid drying, the rapidly dried lactose exists as a non-crystalline glass or amorphous lactose. The amorphous lactose contains alpha- and beta-lactose in the proportions in which they existed in the solution.

If a dilute solution of lactose is rapidly dried there is no pre-crystallization before drying and the lactose is obtained substantially as amorphous lactose having the equilibrium ratio of alpha and beta-lactose. lactose. However, when such solutions are rapidly dried some pre-crystallization usually occurs before or during the drying step and the resultant dried lactose contains both crystalline and amorphous lactose. If the rapid drying occurs at temperatures above about 200° F the crystalline lactose obtained during the rapid drying will be crystalline beta-lactose. If the rapid drying occurs at temperatures below about 200° F any crystalline lactose obtained will be alpha-lactose. Amorphous lactose produced during rapid drying, whether the rapid drying occurs at temperatures above or below 200° F will contain alpha- and beta-lactose in equilibrium proportions.

In accordance with the present invention lactose is dried by a method which produces lactose which has a major amount of amorphous lactose but also has crystalline beta-lactose. The lactose should be at least about 50 percent amorphous lactose and should contain at least about 65 percent beta-lactose. The beta-lactose should be at least about 20 percent by weight crystalline beta-lactose but should have as much amorphous beta-lactose as required to provide at least about 50 percent amorphous lactose, both alpha and beta forms, in the lactose product. All percentages set forth herein are by weight, unless otherwise specified.

In accordance with the invention it has been discovered that a lactose product having unique properties in respect to direct tableting may be prepared by spraying a lactose solution onto a surface maintained at a temperature above about 200° F. The spraying is conducted under conditions such that the lactose product obtained during drying contains at least about 50 percent amorphous lactose and further contains at least about 65 percent beta-lactose, of which at least about 20 percent by weight is crystalline beta-lactose. All of the alpha-lactose present in the product obtained by the drying method of the invention is amorphous alpha-lactose.

In accordance with the invention, an aqueous lactose solution is firt prepared. The lactose solution should have from about 40 percent lactose solids to about 60 percent lactose solids by weight. If the lactose solution has less than about 40 percent lactose, the drying occurs too slowly and the level of crystalline beta-lactose produced may be too high. If the concentration of lactose in the lactose solution is above about 60 percent, the solution becomes too viscous, spraying becomes difficult and the level of crystalline beta-lactose may be too low.

The surface onto which the lactose solution is sprayed should have good heat transfer properties and is preferably a metallic material. The surface is heated to a temperature of at least 200°F and preferably to a temperature of from between about 210°F to about 300°F. At the lower temperatures within the range set forth the lactose solution is sprayed onto the surface at a level as low as about 0.005 pounds per square foot of heated surface. At higher temperatures within the range set forth the lactose solution may be sprayed onto the surface at a level of up to about 0.20 pounds per square foot of surface area. The lactose is allowed to remain in contact with the heated surface for a period sufficient to remove the water from the lactose solution but is removed immediately after the water has been removed to prevent burning of the lactose. Generally, the lactose is allowed to remain in contact with the heated surface for a period of from about one second to about twenty seconds. Thereafter, the lactose is removed from the heated surface by any suitable method, such as by scraping the lactose from the surface.

Under the conditions of drying of the lactose as described above, a lactose product is obtained which has at least about 50 percent amorphous lactose and at least about 65 percent beta-lactose, the beta-lactose being at least about 20 percent crystalline beta-lactose.

A preferred method for effecting drying of the lactose in accordance with the invention is to spray a lactose solution onto a revolving heated drum. The drum may be heated on the interior surface thereof by maintaining a steam atmosphere within the interior of the drum. It should be understood that the method of the present invention for drying lactose to provide a particular lactose product is distinct from roll drying wherein a solution is deposited in the "nip" or "bite" of a double drum dryer. When a double drum dryer is used to dry lactose a higher proportion of crystalline lactose and a lower proportion of amorphous lactose are obtained. Also, use of a double drum dryer presents problems in that the lactose tends to burn onto the drying drum at the edges of the drum where end dams are provided. Also, drying of lactose with a double drum dryer is difficult in that the spacing of the two drying drums is hindered due to the granular and abrasive character of the dried lactose. Such granular characteristics tend to cause the bearings of the drum dryer to break.

The lactose of the invention has characteristics that are unique to tableting by a direct tableting process. When a sufficient amount of the lactose is incorporated in tableting mixtures, improved results are obtained. Tablets formed from a lactose containing tableting mixture wherein the lactose component of the mixture contains at least about 65 percent by weight beta-lactose of which at least about 20 percent is crystalline beta-lactose, and is at least about 50 percent amorphous lactose have improved resistance to capping and loss of weight upon shaking and are more readily dissolved than are tablets containing lactose which has less than about 65 percent by weight of beta-lactose. The percentage of beta-lactose in the lactose product may vary from about 65 percent to about 80 percent with the remaining percentage of the lactose being alpha-lactose. The portion of the beta-lactose that is crystalline may vary from about 20 percent to about 50 percent by weight of the lactose product.

The total amount of lactose in the tableting mixture may vary, as desired, according to the particular type of tablets being manufactured. The tableting mixture should contain at least about 25 percent of lactose. However, the tableting mixture desirably contains at least about 50 percent or more of lactose and, in some instances, may contain 90 percent to 95 percent of lactose.

In a specific example of the present invention, lactose is crystallized from a whey concentrate according to known procedures. The crystallized lactose is then dissolved in water and recrystallized. The recrystallized lactose, which is substantially free from whey proteins, is dissolved in a further amount of water to provide a lactose solution having a solids content of about 50 percent. At a solids content of about 50 percent the lactose solution is desirably maintained at a temperature above about 150° F, in order that the solution will remain flowable and to inhibit crystal formation. Lactose solutions containing about 40 percent of lactose are desirably maintained at a temperature above about 140° F and lactose solutions containing about 60 percent of lactose are desirably maintained at temperatures above about 160° F.

The lactose syrup is then sprayed onto a heated rotating drum. The drum is 10 ft. long and has a 3½ ft. diameter. Steam, at a pressure of 85 psig, is introduced into the interior of the rotating drum dryer. The drum is rotated at a speed of 8 rpm. The lactose solution is sprayed onto the dryer at a rate of 2,000 pounds per hour which corresponds to a feed rate of 0.038 pounds per square ft. of dryer surface. The lactose remains on the drum for a period of about 6 seconds and is then scraped from the surface of the drum by a doctor blade positioned about three-fourths of a revolution from the feed point. The lactose is sprayed onto the surface of the drum by a series of 5 to 9 spray nozzles which are connected to a manifold extending across the width of the drum. The spray pressure is 20 psig and the spray pattern is a flat pattern which covers the entire length of the drum.

The lactose obtained from the surface of the drum has a moisture content of about 0.3 percent and is in the form of small flakes. The flakes are preferably screened in order to provide a lactose product having an average particle size of 60 mesh, Tyler standard screen size, or smaller. Any tailings from the 60 mesh screen may be ground and rescreened. Although the lactose is generally screened to 60 mesh or smaller particle size other particle sizes may be employed. It has been found that a 60 mesh or smaller average particle size provides a lactose product that is particularly suitable for direct tableting procedures. In some instances it may be desirable to have a lactose product having particles of either greater or smaller average particle size.

The lactose product obtained by the above example has 74.3 percent total beta-lactose of which 36.1 percent is crystalline beta-lactose. The lactose product has 25.7 percent amorphous alpha-lactose.

In some instances, it may be desirable to add a dye to the lactose solution in order to provide a colored lactose product which may be used to provide colored tablets. Colored tablets are normally employed to indicate particular active ingredients and/or to provide an attractive product. It has been discovered that if the dye, generally a water-soluble dye, is added to the lactose solution prior to drying of the lactose in accordance with the invention, a uniformly colored lactose product is obtained which, when directly tableted with an active ingredient, forms a uniformly colored tablet that is acceptable for marketing. This is a distinct advantage over lactose products obtained by spray drying a lactose solution. Spray dried lactose solutions, containing a water soluble dye, provide a colored lactose product with distinct variations in color. Such spray dried colored lactose is generally considered unacceptable for producing colored tablets for pharmaceutical purposes.

Tablets formed from lactose dried by the method of the present invention in which the lactose component of the tableting mixture comprises at least about 65 percent beta-lactose and is at least about 60 percent amorphous lactose may also be used in direct retableting or regranulation processes. Re-tableting is a process in which the tableting mixture is tableted and at a later date is ground and retableted. However, the lactose prepared by the drying method of the present invention is particularly suitable for preparing tableting mixtures which are to be direct tableted.

In a particular example of the present invention. a tableting mixture containing 90 percent lactose dried by the method of the present invention was used to produce over 10,000 tablets by a direct tableting process. Of the 10,000 tablets produced, none of the tablets were capped, either off of the tableting machine or during a 1 hour shaking period subsequent to preparation of the tablets.

An improved method for preparing lactose which is to be used in direct tableting formulations has been provided. The method provides lactose which may be used in direct tableting formulations which are more resistant to capping, both during the tableting process and during mechanical handling of the tablets. The method further provides lactose which may be used to provide tableting mixtures which have improved flow characteristics and which may be used in high speed tableting operations.

Although certain features of the invention have been set forth with particularity in order to completely describe the invention, it is intended that other modes and methods, within the skill of the art, may be employed.

Various of the features of the present invention are set forth in the following claims.

What is claimed is:

1. A method for the manufacture of lactose which is particularly suitable for the preparation of tablets by direct tableting which method comprises forming an aqueous lactose solution containing from about 40 to about 60 percent by weight of lactose, spraying said lactose solution onto a surface maintained at a temperature of at least about 200°F. so that the lactose solution is applied at a rate of from about 0.005 to about 0.20 pounds of said solution per square foot of said surface per hour, permitting said lactose solution to remain in contact with said heated surface for a period of time sufficient to remove substantially all of the moisture from said lactose solution, and removing said dried lactose from said surface to provide a lactose product having at least about 50 percent amorphous lactose, at least about 65 percent beta-lactose, and at least about 20 percent crystalline beta-lactose.

2. A method in accordance with claim 1 wherein said heated surface is maintained at a temperature of from about 210°F to about 300°F.

3. A method in accordance with claim 1 wherein said lactose solution is allowed to remain in contact with said heated surface for a period of from about 1 second to about 20 seconds.

4. A method in accordance with claim 1 wherein said lactose product has from about 65 percent to about 80 percent beta-lactose, said beta-lactose being from about 20 percent to about 50 percent crystalline beta-lactose.

5. A method in accordance with claim 1 wherein said heated surface is a rotating drum.

6. A method in accordance with claim 5 wherein said drum is rotated at a speed of from about 4 to about 32 revolutions per minute.

* * * * *